(12) United States Patent
Bulava et al.

(10) Patent No.: US 10,277,648 B2
(45) Date of Patent: *Apr. 30, 2019

(54) SYSTEMS AND METHODS FOR PLAYING ADAPTIVE BITRATE STREAMING CONTENT BY MULTICAST

(71) Applicant: DIVX, LLC, San Diego, CA (US)

(72) Inventors: Yuri Bulava, Tomsk (RU); Alexander Ivanov, Tomsk (RU)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,616

(22) Filed: Aug. 30, 2017

(65) Prior Publication Data

US 2017/0366589 A1 Dec. 21, 2017

Related U.S. Application Data

(63) Continuation of application No. 15/190,069, filed on Jun. 22, 2016, now Pat. No. 9,774,646, which is a continuation of application No. 14/144,268, filed on Dec. 30, 2013, now Pat. No. 9,386,067.

(51) Int. Cl.
*H04L 29/06* (2006.01)
(52) U.S. Cl.
CPC ........ *H04L 65/4076* (2013.01); *H04L 65/601* (2013.01); *H04L 65/80* (2013.01)
(58) Field of Classification Search
CPC ... H04L 65/4076; H04L 65/80; H04L 65/601; H04L 65/602; H04L 65/607; H04L 65/608; H04L 67/02; H04L 12/185; H04L 65/605; H04N 21/8456; H04N 21/23439; H04N 21/6405
See application file for complete search history.

(56) References Cited

U.S. PATENT DOCUMENTS

| 6,848,004 B1 | 1/2005 | Chang et al. |
| 7,085,814 B1 | 8/2006 | Gandhi et al. |
| 8,121,124 B2 | 2/2012 | Baykal |

(Continued)

OTHER PUBLICATIONS

"Microsoft's MS-SDPEXT Specification", Session Description Protocol (SOP) Version 2.0 Extensions, Jun. 8, 2011, 55 pages.

(Continued)

*Primary Examiner* — Ninos Donabed
(74) *Attorney, Agent, or Firm* — KPPB LLP

(57) ABSTRACT

Systems and methods for playing adaptive bitrate streaming content by multicast in accordance with embodiments of the invention are disclosed. In one embodiment, a method of receiving and playing back adaptive bitrate streaming content using a playback device includes receiving an adaptive streaming session description including information about a piece of adaptive streaming content and information for accessing a multicast session of the piece of adaptive streaming content using a playback device, receiving portions of a first alternative stream of the piece of adaptive streaming content sent to a first multicast group that includes the playback device using the playback device, computing a bandwidth measurement using the playback device, and switching to a second alternative stream of the piece of adaptive streaming content based upon the computed bandwidth measurement using the playback device.

20 Claims, 4 Drawing Sheets

(56) References Cited

U.S. PATENT DOCUMENTS

| | | | |
|---|---|---|---|
| 8,914,534 B2 | 12/2014 | Braness et al. | |
| 9,386,067 B2 | 7/2016 | Bulava et al. | |
| 9,774,646 B2 | 9/2017 | Bulava et al. | |
| 2002/0141365 A1* | 10/2002 | Leung | H04L 12/189 370/335 |
| 2003/0206549 A1 | 11/2003 | Mody et al. | |
| 2004/0139088 A1 | 7/2004 | Mandato et al. | |
| 2006/0064716 A1 | 3/2006 | Sull et al. | |
| 2008/0098446 A1 | 4/2008 | Seckin et al. | |
| 2008/0102749 A1* | 5/2008 | Becker | H04L 12/1877 455/3.06 |
| 2008/0212583 A1* | 9/2008 | Rey | H04L 12/1836 370/390 |
| 2008/0281943 A1 | 11/2008 | Shapiro | |
| 2008/0293428 A1* | 11/2008 | Rey | H04L 12/18 455/452.2 |
| 2009/0006626 A1 | 1/2009 | Yamagishi | |
| 2010/0054257 A1 | 3/2010 | Dolganow et al. | |
| 2011/0153856 A1 | 6/2011 | Piepenbrink | |
| 2011/0265130 A1 | 10/2011 | Shang | |
| 2012/0140645 A1* | 6/2012 | Bonta | H04N 21/238 370/252 |
| 2012/0158948 A1* | 6/2012 | Pang | H04L 65/4076 709/224 |
| 2013/0007200 A1 | 1/2013 | van der Schaar et al. | |
| 2013/0091249 A1* | 4/2013 | McHugh | H04N 21/23439 709/219 |
| 2013/0148661 A1 | 6/2013 | McCanne | |
| 2014/0199044 A1* | 7/2014 | Gupta | H04L 67/10 386/239 |
| 2015/0188962 A1 | 7/2015 | Bulava et al. | |
| 2015/0188963 A1 | 7/2015 | Bulava et al. | |
| 2016/0301726 A1 | 10/2016 | Bulava et al. | |

OTHER PUBLICATIONS

Handley, M. et al., "SDP: Session Description Protocol", Jul. 2006, Network Working Group, Retrieved from http://tools.ietf.org/html/rfc4566 on Dec. 30, 2013, 34 pages.

Rosenberg et al., "RFC 3264 An Offer/Answer Model with the Session Description Protocol (SDP)", Columbia University, Jun. 2002, Section 1 p. 2-3, Section 8 p. 13-18, 25 pages.

Author Unknown, "ATSC Standard: Signaling, Delivery, Synchronization, and Error Protection", Advanced Television Systems Committee, Dec. 6, 2017, 205 pgs.

Author Unknown, "Optimal distribution of MPEG DASH OTT services to network edge nodes", Rai, Thesis proposal, 1 page.

Chernock, "A Tutorial on ATSC 3.0 Signaling and Announcement: The Next PSIP", The Broadcast Bridge, Playout and Transmission, https://www.thebroadcastbridge.com/content/entry/7227/a-tutorial-on-atsc-3.0-signaling-and-announcement-the-next-psip, 6 pgs.

Dubin et al, "Adaptation Logic for HTTP Dynamic Adaptive Streaming using Geo-Predictive Crowdsourcing", Multimedia Systems 24, No. 1, 2018, 11 pgs.

Ki et al, "Route/DASH Server System Development for Real-Time UHD Broadcasting", in Advanced Communication Technology (ICACT), 2017 19th International Conference on, IEEE, 2017, pp. 796-799.

Myslinski, "The Timing of ATSC 3.0 Could Not Be Better: The advantages broadcasters have over CDNs", TVTechnology, Jan. 8, 2017, https://www.tvtechnology.com/atsc/the-timing-of-atsc-30-could-not-be-better, 6 pgs.

Stockhammer et al, "DASH in ATSC 3.0: Bridging the Gap Between OTT and Broadcast", IBC Technical Papers, https://www.ibc.org/delivery/dash-in-atsc-30-bridging-the-gap-between-ott-and-broadcast/834.article, Mar. 21, 2017, 3 pgs.

Stockhammer et al, "DASH in ATSC 3.0: Bridging the Gap Between OTT and Broadcast", IBC, 2016, 9 pgs.

Weil, "The new frontiers of OTT delivery: Multicast, P2P & Hybrid", Feb. 2, 2014, https://blog.eltrovemo.com/1336/the-new-frontiers-of-ott-delivery-multicast-p2p-hybrid/, 27 pgs.

Wong et al, "Supporting Interactive Video-on-Demand Wth Adaptive Multicast Streaming", IEEE Transactions on Circuits and Systems for Video Technology 17, No. 2, 2007, pp. 129-142.

* cited by examiner

SYSTEMS AND METHODS FOR PLAYING ADAPTIVE BITRATE STREAMING CONTENT BY MULTICAST

CROSS-REFERENCE TO RELATED APPLICATIONS

The current application is a continuation of U.S. patent application Ser. No. 15/190,069, filed Jun. 22, 2016, entitled "Systems and Methods for Playing Adaptive Bitrate Streaming Content by Multicast" to Bulava et al., which is a continuation of U.S. application Ser. No. 14/144,268, entitled "Systems and Methods for Playing Adaptive Bitrate Streaming Content by Multicast", filed Dec. 30, 2013 and issued Jul. 5, 2016 as U.S. Pat. No. 9,386,067, the disclosures of which are incorporated herein by reference in their entireties.

FIELD OF THE INVENTION

The present invention generally relates to streaming media playback and more specifically to systems for distributing adaptive bitrate content by multicast over a network.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming, or adaptive streaming, involves detecting the present streaming conditions (e.g. the user's network bandwidth and CPU capacity) in real time and adjusting the quality of the streamed media accordingly. Typically, the source media is encoded at multiple maximum bit rates and the playback device or client switches between streaming the different encodings depending on available resources. When a playback device commences adaptive bitrate streaming, the playback device typically starts by requesting portions of media from the streams having the lowest maximum bitrates (where alternative streams are available). As the playback device downloads the requested media, the playback device can measure the available bandwidth. In the event that there is additional bandwidth available, the playback device can switch to higher bitrate streams.

SUMMARY OF THE INVENTION

Systems and methods for playing adaptive bitrate streaming content by multicast in accordance with embodiments of the invention are disclosed. In one embodiment, a method of receiving and playing back adaptive bitrate streaming content using a playback device includes receiving an adaptive streaming session description including information about a piece of adaptive streaming content and information for accessing a multicast session of the piece of adaptive streaming content using a playback device, receiving portions of a first alternative stream of the piece of adaptive streaming content sent to a first multicast group that includes the playback device using the playback device, computing a bandwidth measurement using the playback device, and switching to a second alternative stream of the piece of adaptive streaming content based upon the computed bandwidth measurement using the playback device.

A further embodiment includes joining the first multicast group.

In another embodiment, joining the first multicast group includes establishing multicast group membership using Internet Group Management Protocol (IGMP).

In a still further embodiment, the adaptive streaming session description is a modified Session Description Protocol (SDP) message.

In still another embodiment, the adaptive streaming session description includes a first multicast group address associated with the first multicast group.

In a yet further embodiment, the adaptive streaming session description includes an attribute value of "a=X-DivX-Adaptive".

In yet another embodiment, the adaptive streaming session description includes a plurality of bandwidth and media fields associated with a plurality of alternative streams of the piece of content.

In a further embodiment again, each media field designates a media type and a port number.

Another embodiment again also includes receiving the adaptive streaming session description from a session directory server using the playback device.

A further additional embodiment also includes receiving the adaptive streaming session description from the content server using the playback device.

In another additional embodiment, computing a bandwidth measurement using the playback device includes receiving bandwidth measurement data using the playback device that expects to receive the bandwidth measurement data without requesting it.

In a still yet further embodiment, computing a bandwidth measurement using the playback device includes sending bandwidth requests to a content server and receiving bandwidth measurement data with which the playback device can calculate available bandwidth.

In still yet another embodiment, bandwidth measurement data includes random data.

In a still further embodiment again, bandwidth measurement data includes key frames from the content.

In still another embodiment again, bandwidth measurement data includes metadata about the content.

In a still further additional embodiment, bandwidth measurement data includes thumbnails of the content.

In still another additional embodiment, receiving bandwidth measurement data with which the playback device can calculate available bandwidth includes receiving progressively larger amounts of data.

In a yet further embodiment again, receiving progressively larger amounts of data is halted once the playback device has determined that there is sufficient additional bandwidth to switch to the second alternative stream that has a higher maximum bitrate than the first alternative stream.

Yet another embodiment again also includes buffering the received portions of the alternative stream of the piece of adaptive streaming content using the playback device, receiving a user instruction using the playback device, and performing a trick play operation in displaying content based upon the received user instruction using the playback device.

In a yet further additional embodiment, switching to a second alternative stream of the piece of adaptive streaming content based upon the computed bandwidth measurement using the playback device includes receiving the second alternative stream using a different port than the port used to receive the first alternative stream.

In yet another additional embodiment, switching to a second alternative stream of the piece of adaptive streaming content based upon the computed bandwidth measurement using the playback device includes joining a second multicast group that is receiving the second alternative stream and that is different from the first multicast group.

In a further additional embodiment again, a playback device for receiving and playing back multicast adaptive bitrate streaming content, the playback device including a processor, a network interface, a memory configured to store a decoder application, and an adaptive streaming session description, where the processor is configured by the decoder application to receive an adaptive streaming session description including information about a piece of adaptive streaming content and information for accessing a multicast session of the piece of adaptive streaming content using the network interface, receive portions of a first alternative stream of the piece of adaptive streaming content sent to a first multicast group that includes the playback device using the network interface, compute a bandwidth measurement, and switch to a second alternative stream of the piece of adaptive streaming content based upon the computed bandwidth measurement.

In another additional embodiment again, the processor is also configured by the decoder application to join the first multicast group.

In a still yet further embodiment again, joining the first multicast group includes establishing multicast group membership using Internet Group Management Protocol (IGMP).

In still yet another embodiment again, the adaptive streaming session description is a modified Session Description Protocol (SDP) message.

In a still yet further additional embodiment, the adaptive streaming session description includes a first multicast group address associated with the first multicast group.

In still yet another additional embodiment, the adaptive streaming session description includes an attribute value of "a=X-DivX-Adaptive".

In a yet further additional embodiment again, the adaptive streaming session description includes a plurality of bandwidth and media fields associated with a plurality of alternative streams of the piece of content.

In yet another additional embodiment again, each media field designates a media type and a port number.

In a still yet further additional embodiment again, the processor is also configured by the decoder application to receive the adaptive streaming session description from a session directory server using the network interface.

In still yet another additional embodiment again, the processor is also configured by the decoder application to receive the adaptive streaming session description from a content server using the network interface.

In another further embodiment, computing a bandwidth measurement using the playback device includes receiving bandwidth measurement data using the playback device that expects to receive the bandwidth measurement data without requesting it.

In still another further embodiment, the processor being configured by the decoder application to compute a bandwidth measurement includes the processor being configured to send bandwidth requests to a content server and receive bandwidth measurement data with which the playback device can calculate available bandwidth.

In yet another further embodiment, bandwidth measurement data includes random data.

In another further embodiment again, bandwidth measurement data includes key frames from the content.

In another further additional embodiment, bandwidth measurement data includes metadata about the content.

In a further embodiment, bandwidth measurement data includes thumbnails of the content.

In another embodiment, the processor being configured to receive bandwidth measurement data with which the playback device can calculate available bandwidth includes the processor being configured to receive progressively larger amounts of data.

In a still further embodiment, the processor being configured to receive progressively larger amounts of data is halted once the playback device has determined that there is sufficient additional bandwidth to switch to the second alternative stream that has a higher maximum bitrate than the first alternative stream.

In still another embodiment, the processor is also configured by the decoder application to buffer the received portions of the alternative stream of the piece of adaptive streaming content, receive a user instruction, and perform a trick play operation in displaying content based upon the received user instruction.

In a yet further embodiment, the processor being configured to switch to a second alternative stream of the piece of adaptive streaming content based upon the computed bandwidth measurement includes the processor being configured to receive the second alternative stream using a different port than the port used to receive the first alternative stream.

In yet another embodiment, the processor being configured to switch to a second alternative stream of the piece of adaptive streaming content based upon the computed bandwidth measurement includes the processor being configured to join a second multicast group that is receiving the second alternative stream and that is different from the first multicast group.

DETAILED DISCLOSURE OF THE INVENTION

Figure 1:
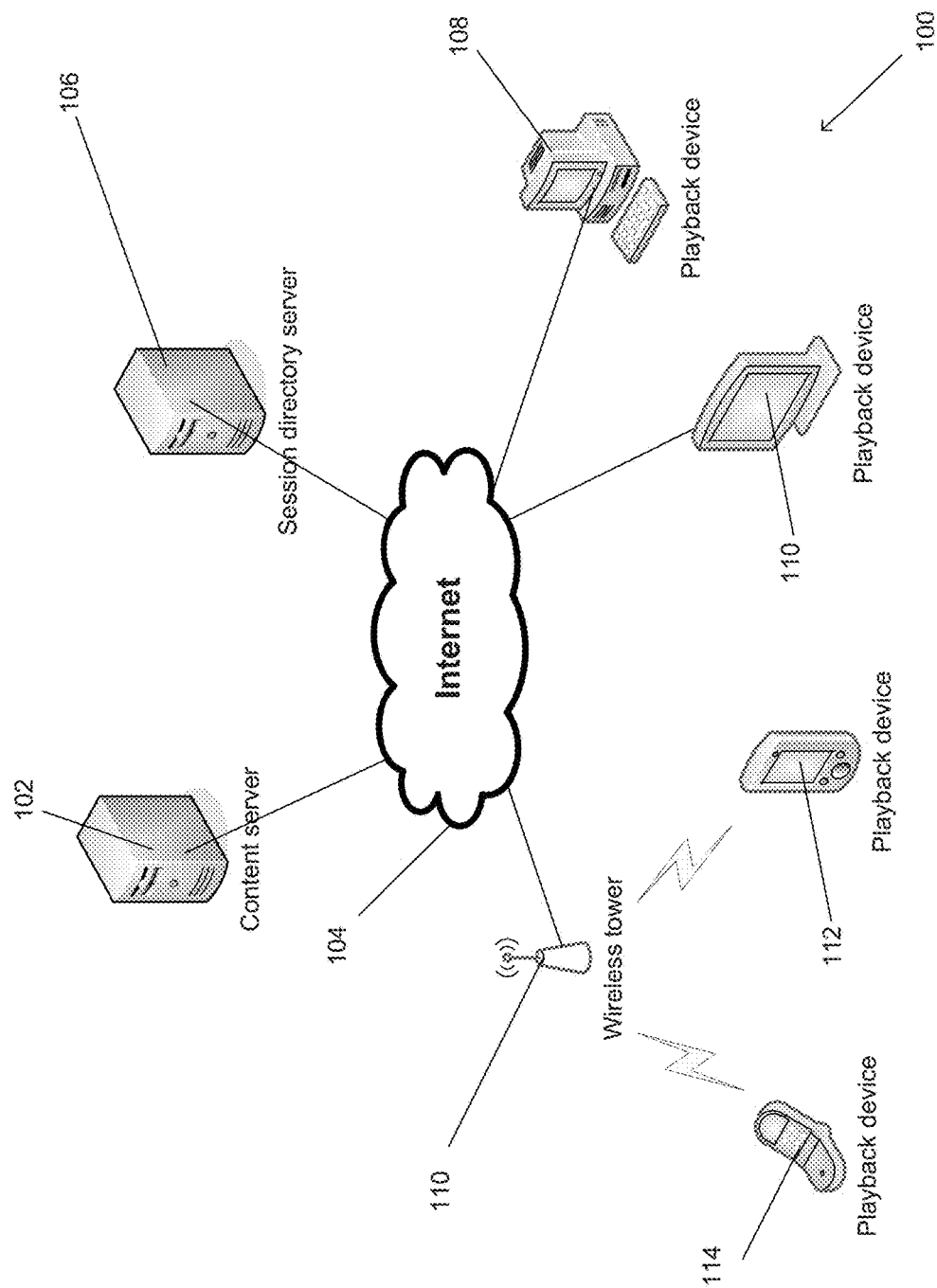
FIG. 1 is a system diagram of an adaptive streaming system in accordance with embodiments of the invention.

Turning now to the drawings, systems and methods for multicasting adaptively streamed content in accordance with embodiments of the invention are illustrated. In adaptive streaming systems, multimedia content is encoded as a set of alternative streams of video data. Alternative streams are streams that encode the same media content in different ways (e.g., different resolutions and/or maximum bitrates) to enable adaptive bitrate streaming by performing switches between the streams during normal playback based upon the streaming conditions. Content servers providing content via adaptive streaming are configured to stream multimedia content encoded at different maximum bitrates and resolutions over a network, such as the Internet. Adaptive streaming systems stream the highest quality multimedia content that can be supported based upon current streaming conditions between the content server and the receiving playback device. Multimedia content typically includes video and audio data, subtitles, and/or other related metadata. In order to provide the highest quality video experience independent of the network data rate, adaptive streaming systems are configured to switch between the available sources of video data throughout the delivery of the video data according to a variety of factors, including, but not limited to, the available network data rate and video decoder performance. When streaming conditions deteriorate, an adaptive streaming system typically attempts to switch to multimedia streams encoded at lower maximum bitrates. In the event that the available network data rate cannot support streaming of the stream encoded at the lowest maximum bitrate, then playback is often disrupted until a sufficient amount of content can be buffered to restart playback. Systems and methods for switching between video streams during playback that may be utilized in an adaptive streaming system in accordance with embodiments of the invention are described in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the entirety of which is incorporated herein by reference.

Multimedia content can be distributed by multicast over a network. Multicast network protocols transmit data messages on a one-to-many (one sender, multiple recipients) or many-to-many (multiple senders, multiple recipients) basis, in contrast to unicast protocols that transmit messages to a single network destination. In many multicast protocols, a multicast group designates the recipients interested in receiving messages to the group. Participants (senders and recipients) join the multicast group and send messages to a multicast group address for distribution among the multicast group members. In other multicast protocols, all recipient addresses are included within each message or packet. Still other multicast protocols utilize other techniques to designate interested multicast recipients. In the transport layer, a common protocol that utilizes multicast addressing is the User Datagram Protocol (UDP) and a common protocol that utilizes unicast addressing is Transmission Control Protocol (TCP). UDP and TCP utilize IP (Internet Protocol) datagrams. Multicast protocols that use IP datagrams can be referred to more specifically as IP multicast. Efficiency in multicast can result from a sender only needing to transmit a message once and having other network elements replicate the message if necessary. Multicasting can be useful in conserving the amount of network traffic involved in sending data to multiple recipients, particularly when streaming live multimedia such as sporting events.

While multicast may be used for multimedia content delivery, there can be a problem in coordinating the delivery of multiple alternative streams utilized in adaptive bitrate streaming. In many embodiments of the invention, interested recipients of adaptive bitrate streaming content (e.g., playback devices) are informed of the availability of alternative streams by a specialized session description. A session description is an announcement of streaming media initialization parameters whose format can be defined using a session description protocol such as (but not limited to) the Session Description Protocol (SDP) specified in the IETF Proposed Standard RFC 4566. In many embodiments of the invention, the SDP session description format is extended using existing and additional fields to support adaptive bitrate streaming of multiple streams by multicast. A content server may offer alternative streams of a piece of content where the streams contain the same content at different quality levels (e.g., resolution and/or bitrate). The content server may multicast the various alternative streams over different logical connections (e.g., using different ports) to playback devices over a network. In some embodiments, each alternative stream is multicast with a different port to a multicast group of playback devices that are configured to receive the stream. Fields in an adaptive streaming session description having the format of an SDP message in accordance with embodiments of the invention can contain information that a playback device can use to switch between alternative streams of different quality levels according to the bandwidth available to the playback device, such as, but not limited to, ports and bandwidth requirements of the alternative streams.

In several embodiments, a playback device establishes a separate connection session with an adaptive streaming system for making bandwidth measurements so that it can select an alternative stream to be downloaded given the current bandwidth. By estimating the total or available bandwidth, a playback device can determine an appropriate alternative stream and switch to a second alternative stream, such as by changing to the port the second alternative stream is transmitted on. In many embodiments, bandwidth measurement is performed using ports other than the ports used for content delivery. In several embodiments, bandwidth measurement utilizes a connection-oriented protocol such as TCP while content delivery utilizes a connectionless protocol such as UDP.

Although the present invention is described below with respect to specific protocols such as session description protocol (SDP) and real-time protocol (RTP), the systems and methods described are equally applicable using other protocols with similar characteristics and capabilities to inform playback devices of the availability of multicast adaptive bitrate content streams from a content server and the associated connection parameters. System architectures for adaptive streaming systems in accordance with embodiments of the invention are discussed below.

Adaptive Streaming System Architecture

Adaptive streaming systems in accordance with embodiments of the invention are configured to generate multiple streams of video to be made available for streaming to user devices. In many embodiments of the invention, an adaptive streaming system includes a content server that multicasts multiple streams of video to playback devices. An adaptive streaming system in accordance with embodiments of the invention is illustrated in FIG. 1. The illustrated adaptive streaming system 100 includes a content server 102 configured to distribute multimedia content as a number of alternative streams using a protocol capable of multicast addressing. As is discussed further below, the content server 102 can generate an adaptive streaming session description that informs playback devices how to access the alternative streams. The content server 102 can send the adaptive streaming session description to a session directory server 106 that can help in distributing adaptive streaming session descriptions and/or directly to playback devices. The session directory server 106 may be more well-known or accessible to playback devices that are not aware of sessions and/or content servers that are available.

The content server 102 then multicasts the alternative streams to playback devices that are configured to participate in a multicast group receiving the alternative streams. A variety of playback devices 108, 110, 112, and 114 belonging to a multicast group can receive portions of the content streams from the content server 102 via a network 104 such as the Internet. A playback device 108 can use information in an adaptive stream session description to select an alternative stream from multiple alternative streams where the selected stream has a maximum bitrate that is close to but less than the current bandwidth between the content server 102 and playback device 108. Bandwidth between the content server 102 and playback device 108 can be measured using a connection on ports different from those used for transfer of the content. In several embodiments, the playback device 108 sends a bandwidth request to the content server 102 and receives bandwidth measurement data that it can use to calculate current bandwidth (e.g., by using the size of the data and time to transfer the data).

In the illustrated embodiment, playback devices include personal computer 108, television 110, and mobile phones 112 and 114. In other embodiments, playback devices can include consumer electronics devices such as DVD players, Blu-ray players, set top boxes, video game consoles, tablets, and other devices that are capable of connecting to a server and playing back adaptive bitrate encoded media.

Although a specific adaptive streaming system architecture for delivering multicast adaptive bitrate content streams is discussed above with respect to FIG. 1, any of a variety of streaming systems can be utilized to deliver multicast adaptive bitrate content streams and enable playback devices to access adaptive bitrate content in accordance with embodiments of the invention.

Figure 2A:
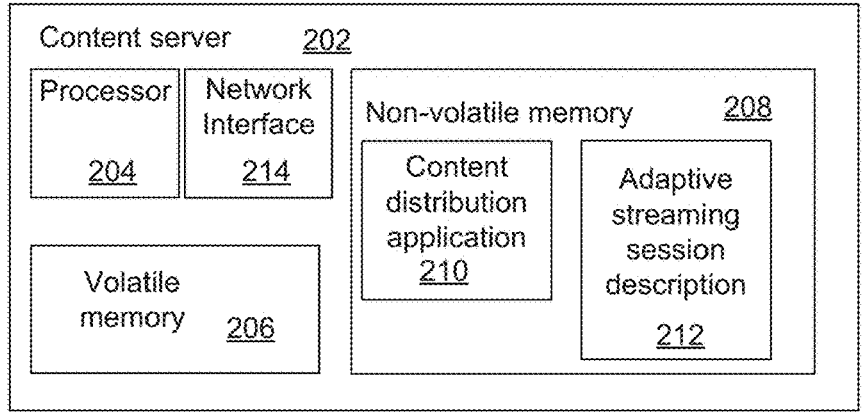
FIG. 2A conceptually illustrates a content server configured to generate an adaptive streaming session description and distribute adaptive bitrate streaming content in accordance with embodiments of the invention.

Content servers in accordance with many embodiments of the invention can load a content distribution application as machine readable instructions from memory or other storage. A content server in accordance with an embodiment of the invention is illustrated in FIG. 2A. The content server 202 includes a processor 204, volatile memory 206 and non-volatile memory 208 that includes a content distribution application 210 and an adaptive streaming session description 212 (once it is generated). In the illustrated embodiment, the non-volatile memory 208 is a machine readable media that is utilized to store the machine readable instructions that configure the processor 204. In several embodiments, a content distribution application can be loaded from any kind of memory or storage device including volatile memory in accordance with many embodiments of the invention.

The content distribution application can configure the content server 202 to provide multiple streams of adaptive bitrate media content to playback devices in a multicast group using network interface 214. The network interface 214 can be configured to transmit multicast data messages using a User Datagram Protocol (UDP) based protocol such as Real-Time Protocol (RTP) or other communication protocol that enables multicast addressing. A multicast group designates the recipients interested in receiving multicast messages that are sent to the group. In many embodiments, the content distribution application configures the content server to generate an adaptive streaming session description that informs playback devices in a multicast group how to access the streams and to send the adaptive streaming session description to playback devices and/or session directory servers. In several embodiments, a session description contains streaming media initialization parameters whose format can be defined using a session description protocol such as (but not limited to) the Session Description Protocol (SDP) specified in the IETF Proposed Standard RFC 4566. In many embodiments of the invention, the SDP session description format utilizes existing and additional fields to support adaptive bitrate streaming of multiple streams by multicast, where the streams contain the same media content encoded in different ways (e.g., different resolutions and/or maximum bitrates). As will be discussed further below, an adaptive streaming session description can contain fields such as, but not limited to, those describing the format/encoding of alternative streams of content, ports on which the alternative streams are available, and recommended or required bandwidth for each stream as well as a field indicating that the multicast session includes adaptive bitrate streaming.

The content server 202 may also be configured to assist a playback device in calculating bandwidth to determine an appropriate alternative stream to download according to the calculated bandwidth. Bandwidth measurement may include the content server 202 responding to bandwidth requests from a playback device by sending bandwidth measurement data that the playback device can use to calculate bandwidth. In many embodiments of the invention, bandwidth measurement is performed using ports on the content server and playback device other than the port(s) used for transferring the adaptive bitrate content. In several embodiments, bandwidth measurement utilizes a connection-oriented protocol such as TCP while content delivery utilizes a connectionless protocol such as UDP. The connection-oriented protocol can be utilized in an attempt to estimate the additional bandwidth available beyond the bandwidth required to receive the streamed content. Downloading data for bandwidth measurement can impact video playback performance by creating congestion on the network interface. Therefore, the amount of data downloaded can be gradually increased and playback performance measured to ensure that playback performance is not degrading. Different approaches for measuring bandwidth while maintaining video playback performance are discussed in greater detail further below.

Figure 2B:
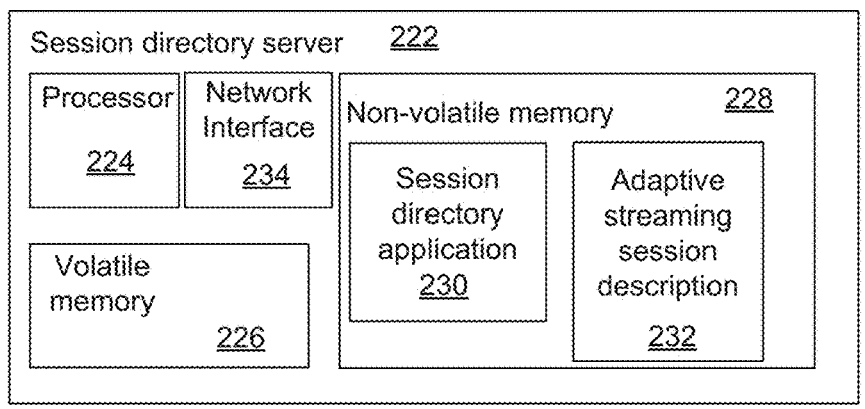
FIG. 2B conceptually illustrates a session directory server configured to manage and distribute adaptive streaming session descriptions in accordance with embodiments of the invention.

Likewise, session directory servers in accordance with many embodiments of the invention can load a session directory application as machine readable instructions from memory. A session directory server in accordance with an embodiment of the invention is illustrated in FIG. 2B. The session directory server 222 includes a processor 224, volatile memory 226 and non-volatile memory 228 that includes a session directory application 280 and one or more session descriptions 232 (once they are received from a content server). In the illustrated embodiment, the non-volatile memory 228 is a machine readable media that is utilized to store the machine readable instructions that configure the processor 224. Here, the non-volatile memory 228 contains the instructions of a session directory application 230, which can be utilized to configure the processor 224 to receive a session description 232 from a content server and/or to send a session description to a playback device using network interface 234. Session directory servers may be used to distribute adaptive streaming session descriptions to playback devices in scenarios such as when a playback device is not aware of a content server or does not have information needed to find or communicate with a content server.

Figure 2C:
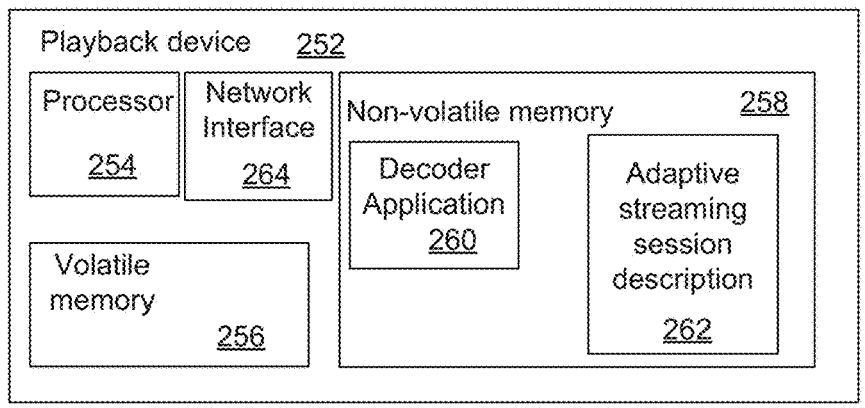
FIG. 2C conceptually illustrates a playback device configured to receive an adaptive streaming session description and play back adaptive bitrate streaming content in accordance with embodiments of the invention.

Similarly, playback devices in accordance with many embodiments of the invention can load a decoder application as machine readable instructions from memory. A playback device in accordance with an embodiment of the invention is illustrated in FIG. 2C. The playback device 252 includes a processor 254, volatile memory 256 and non-volatile memory 258 that includes a decoder application 260. In the illustrated embodiment, the non-volatile memory 258 is a machine readable media that is utilized to store the machine readable instructions that configure the processor 254. Here, the non-volatile memory 258 contains the instructions of a decoder application 260, which can be utilized to configure the processor 254 to decode video. The non-volatile memory 258 may also include a session description 262 received from a content server or session directory server. In many embodiments, a decoder application can be loaded from any kind of memory or storage device including volatile memory in accordance with many embodiments of the invention.

The decoder application can configure the playback device 252 to receive an adaptive streaming session description 262 from a content server or session directory server. The playback device can parse the session description 262 to determine connection parameters for receiving adaptive bitrate media content that is multicast from a content server. Fields in an adaptive streaming session description may include, but are not limited to, those describing the format/encoding of alternative streams of content, ports on which the alternative streams are available, and recommended or required bandwidth for each stream to playback devices in a multicast group using network interface 214. A playback device may use information in a session description to play back one alternative stream of content and conduct bandwidth measurement using a separate logical connection to the content server on ports other than those used for transferring the content. When bandwidth is determined to be higher or lower than the bandwidth recommended or required for the current stream, the playback device 252 may switch to an alternative stream that has a recommended or required bandwidth that is closer to the determined current bandwidth.

Although a multicast adaptive bitrate streaming system is described above with respect to a specific content server, session directory server and playback device, any of a variety of transmitting or decoding systems can be utilized in the transmission and decoding of content as appropriate to specific applications in accordance with many embodiments of the invention. Adaptive streaming session descriptions in accordance with embodiments of the invention are discussed below.

Adaptive Streaming Session Description

In many embodiments of the invention, the Session Description Protocol specified in the IETF Proposed Standard RFC 4566 is extended with fields to support adaptive bitrate streaming with a multicast protocol. SDP is a protocol for broadcasting multicast session information. A session in SDP is described by a series of fields, one per line, that form a set of properties and parameters for negotiating media type, format, and associated properties for a desired piece of streaming content between end points. Each field has the form "<character>=<value>" where "<character>" is a single case-significant character and "<value>" is structured text whose format depends upon the attribute type. Within an SDP message that constitutes a session description there are typically three main sections, detailing the session, timing, and media descriptions. In many implementations, values in an SDP message include the following fields, where optional values are specified with "=*":

Session Description Section
    v=(protocol version number, currently only 0)
    o=(originator and session identifier:username, id, version number, network address)
    s=(session name:mandatory with at least one UTF-8-encoded character)
    i=*(session title or short information)
    u=*(URI of description)
    e=*(zero or more email address with optional name of contacts)
    p=*(zero or more phone number with optional name of contacts)
    c=*(connection information—not required if included in all media)
    b=*(zero or more bandwidth information lines)
    One or more Time descriptions ("t=" and "r=" lines; see below)
    z=*(time zone adjustments)
    k=*(encryption key)
    a=*(zero or more session attribute lines)
    Zero or more Media descriptions (each one starting by an "m=" line; see below)
Time Description Section (Mandatory)
    t=(time the session is active)
    r=*(zero or more repeat times)
Media Description Section (if Present)
    m=(media name and transport address)
    i=*(media title or information field)
    c=*(connection information—optional if included at session level)
    b=*(zero or more bandwidth information lines)
    k=*(encryption key)
    a=*(zero or more media attribute lines—overriding the Session attribute lines)

The "c=" field can be used to convey the multicast group address. In many embodiments of the invention, specialized fields are added to the media description section to make multiple adaptive bitrate streams available to a multicast group, where the multicast group includes playback devices that are intended to and configured to receive multicast messages sent to the group. SDP uses attributes to extend the core protocol. Attributes can appear within the session or media description sections and are scoped accordingly as session-level or media-level. Session-level fields apply to a complete session associated with a given session description. Media-level fields (if present) describe each piece of media available in a session. In several embodiments, each piece of media is an alternative stream of the same perceptual content. An adaptive streaming session description modified in this way can be delivered to the multicast address and port on which the members of the multicast group are configured to receive multicast messages.

In several embodiments, a session description contains an attribute value of "a=X-DivX-Adaptive" in the session and/or media description sections. In other embodiments, any of a variety of predetermined character strings may be utilized for the attribute where the string indicates that the multicast session allows adaptive bitrate streaming and both the content server and playback device are configured for the indicated adaptive bitrate streaming implementation. A playback device configured in this way can understand that the content server is able to provide adaptive bitrate streaming content.

The session and/or media description sections can also include information for port and bandwidth for alternative streams of content and any other information that a playback device can use to determine which alternative stream to access and how to access it. In multicasting multiple streams of content, a server can use different ports for different streams. Each stream may have a recommended or required bandwidth for proper playback of the stream. In many embodiments, the "b=" field is used to convey the recommended or required bandwidth for each available stream. In several embodiments, the "m=" field designates the media type, encoding, format, port and/or transport protocol. In some embodiments, the "b=" and "m=" fields and/or other fields listed above are present in a media description section. In various embodiments, multiple media description sections may be present where each section describes an alternative stream using one or more fields that may include those as described above. As will be discussed in greater detail further below, a playback device can use these connection parameters to select a stream that is appropriate for the current bandwidth and switch streams when bandwidth availability changes during playback. Also as will be discussed below, an adaptive streaming session description may include one or more fields describing a port for a playback device to send bandwidth requests to a content server. Although specific fields in the Session Description Protocol defined by the IETF Proposed Standard RFC 4566 are discussed above, similar modifications can be made to and/or similar fields of information can be provided within any protocol for describing multicast multimedia sessions to enable playback devices to locate and select between alternative streams of content in accordance with embodiments of the invention. Techniques for bandwidth measurement with multicast adaptive bitrate streaming in accordance with embodiments of the invention are discussed below.

Bandwidth Measurement

Adaptive bitrate streaming typically utilizes the resource levels available to a particular device in determining the appropriate stream to acquire and display to a user. The most appropriate stream is often a stream with the highest resolution and/or frame rate that can be transferred over the network connection between the device and the content server and can be processed by the device for display. Resources pertinent to stream selection may include processor activity/capacity and bandwidth of the network connection.

Bandwidth measurement can be considered for the total capacity of the network connection (i.e., absolute throughput when no other data is being transferred) and available capacity (i.e., while other data is being transferred). Often, bandwidth measurement techniques determine the available capacity while content is simultaneously being streamed.

In existing digital content streaming systems, there is often an issue with determining an increase in bandwidth and/or the maximum available bandwidth. Many conventional content servers providing live or video on demand (VOD) content based on RTP (Real-time Transport Protocol), RTSP (Real Time Streaming Protocol), RTMP (Real Time Messaging Protocol) or other real-time streaming protocols deliver data at a rate not exceeding what is required for real-time playback. A playback device can calculate the rate at which data is received, and determine that bandwidth is less than the amount required when there is buffer underflow. However, information regarding additional available bandwidth for a playback device to switch to a higher quality stream may not be available.

In several embodiments of the invention, bandwidth between a playback device and a content server is measured using a separate connection over which data can be downloaded from the content server simultaneously while content is being streamed. In many embodiments, the connection can be made using ports other than those used for transfer of the content. In further embodiments, the connection utilizes the transport control protocol (TCP). In several embodiments, a playback device utilizes a TCP port whose number is determined from information in an adaptive streaming session description. The TCP port can be provided as an individual field in the session description section or media description section (e.g., BM_TCP=1234) or can be assumed to be the same number as the UDP port provided for a stream (e.g., port listed in a field in a media description section). In other embodiments, the TCP port(s) may be predetermined and known to the playback device and content server. In additional embodiments, a playback device requests data from a content server and calculates the current bandwidth from the size of the data and time to receive the data. A content server can be configured to respond to bandwidth measurement data requests by sending bandwidth measurement data, with which the playback device can calculate a current bandwidth. The data may be random data or may be any useful data. Useful data can include information relevant to or necessary to decoding the content such as, but not limited to, 2 to 5 seconds of content, redundantly sending key frames, licenses or other DRM information, metadata about the content, and/or thumbnails. The connection can be made using some of the same properties as that of the connection transferring the content. In many embodiments of the invention, the content server's address is determined from messages sent to the multicast group by the content server, such as SDP messages. In several embodiments, the recvfrom( ) function (available in many Windows and Unix based environments) can be used to determine the source address of a message and store it in a sockaddr structure (sockaddr_from or sockaddr_in various embodiments). A content server's address can be obtained in this way for a playback device to use in requesting content and/or bandwidth measurement data. One skilled in the art will recognize that any of a variety of techniques for calculating bandwidth can be utilized in accordance with embodiments of the invention. Distributing multicast adaptive bitrate content using content servers and playback devices in accordance with embodiments of the invention is discussed below.

Sending Multicast Adaptive Bitrate Content

Figure 3:
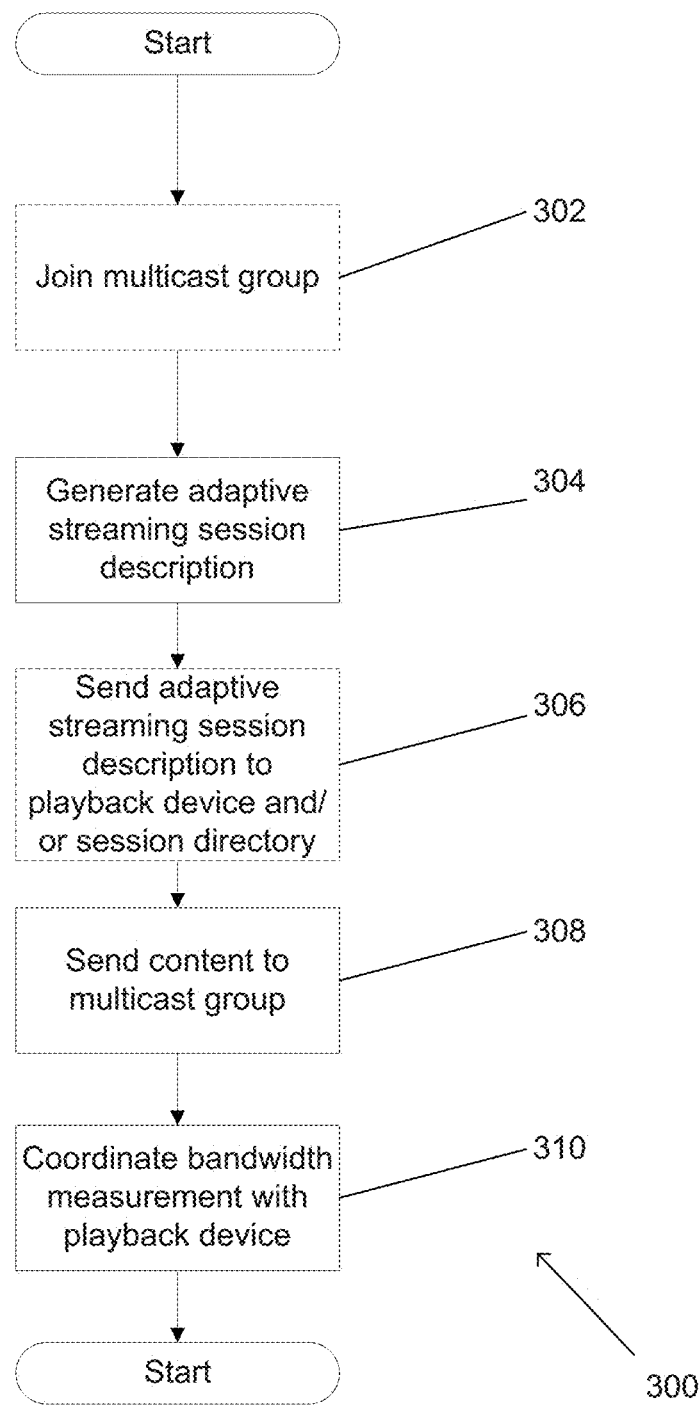
FIG. 3 illustrates a process for distributing adaptive bitrate streaming content by multicast in accordance with embodiments of the invention.

In many embodiments of the invention, a content server is configured to deliver adaptive bitrate streams by multicast by generating an adaptive streaming session description and responding to bandwidth measurement requests. A process for delivering adaptive bitrate streams using a content server in accordance with embodiments of the invention is illustrated in FIG. 3.

The process 300 may include joining 302 a multicast group when the server is not yet part of a particular multicast group. Joining the group may include configuring the system kernel or operating system to receive multicast data messages (e.g., binding a port on a network interface) and/or using a communication protocol such as the Internet Group Management Protocol (IGMP) to establish multicast group membership with a multicast router.

The process 300 includes generating 304 an adaptive streaming session description. As discussed further above, an adaptive streaming session description contains information a playback device can use to join a session of multicast multimedia content offered with adaptive bitrate streaming. An adaptive streaming session description can be based on a modified SDP (Session Description Protocol) message containing an attribute value of "a=X-DivX-Adaptive" in the session description and/or media description sections, and values for bandwidth information "b=<value>" and port numbers in media description sections for different alternative streams. Adaptive streaming session descriptions can also contain a multicast address.

The process 300 may include sending 306 the adaptive streaming session description to a session directory server. In several embodiments of the invention, a session directory server maintains lists of available multicast adaptive streaming sessions and the associated multicast groups. A playback device can obtain an adaptive streaming session description from a session directory server. In other embodiments of the invention, the content server may send the adaptive streaming session description directly to a playback device. One skilled in the art will recognize that any of a variety of methods can be utilized for a playback device to obtain an adaptive streaming session description from a content server.

The process 300 includes sending 308 content to the multicast group. In many embodiments, the multicast group has a multicast group address that is specified in the session description and alternative streams of content (the same perceptual content encoded at different resolutions and/or bitrates) are sent using different ports on the content server. One skilled in the art will recognize that any of a variety of transport protocols can be utilized to distribute the content. In various streaming protocols, a piece of content may be transferred in portions such as chunks. In several embodiments, the content is transferred to playback devices using the Real-time Transport Protocol (RTP). RTP is typically used in conjunction with the RTP Control Protocol (RTCP). RTP carries the media streams and RTCP is used to monitor transmission statistics and quality of service. RTP typically utilizes even port numbers and the associated RTCP communication utilizes the next higher odd port number. In many embodiments, the port numbers and other connection parameters are designated in the session description (SDP message) that is provided to the multicast group. Different ports can be used for different alternative streams of content. In some embodiments of the invention, different alternative streams are sent to the same multicast group using different ports. In other embodiments of the invention, different alternative streams are sent to different multicast groups using the same port number. Alternative streams typically contain the same perceptual content and can be characterized by having different properties related to their encoding, such as, but not limited to, resolution, maximum bitrate, and/or average bitrate.

The process 300 includes coordinating 310 bandwidth measurement with a playback device. The coordination may include responding to bandwidth requests when a playback device sends a request for data with which to calculate bandwidth or proactively sending measurement data when a playback device expects measurement data but does not expressly request it. As discussed further above, the data may be random data or may be any useful data. Useful data can include information relevant to or necessary to decoding the content such as, but not limited to, 2 to 5 seconds of content, redundantly sending key frames, licenses or other digital rights management (DRM) information, metadata about the content, and/or thumbnails. The connection can be made using some of the same properties as that of the connection transferring the content, such as using a recv-from( ) function to obtain the content server address. A playback device can calculate bandwidth from the process of obtaining bandwidth measurement data, such as by using the size of the data and time to transfer the data.

Although a specific process for sending adaptive bitrate streaming content by multicast is discussed above with respect to FIG. 3, any of a variety of processes can be utilized to provide multicast content in accordance with embodiments of the invention.

Receiving Adaptive Bitrate Multicast Content

Figure 4:
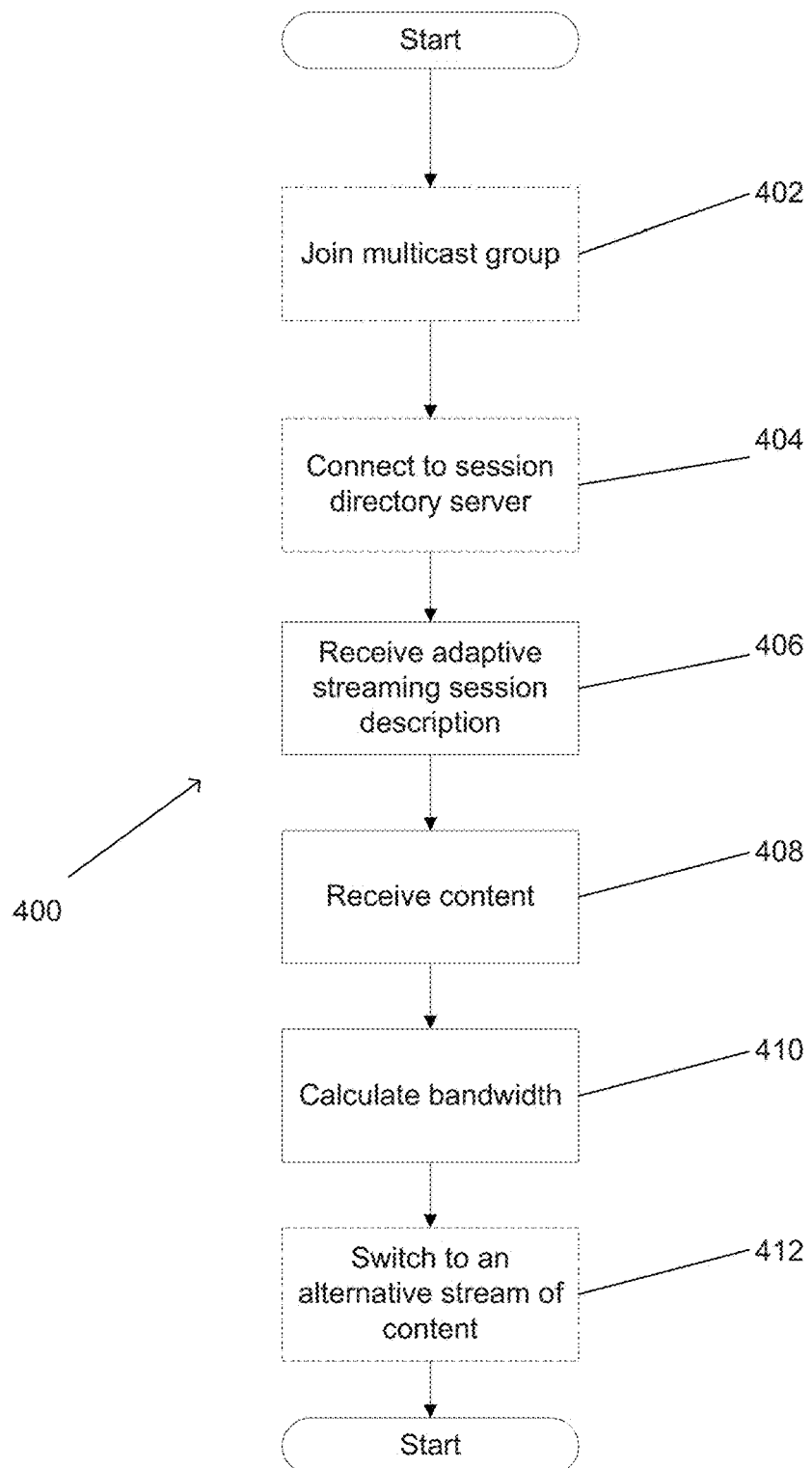
FIG. 4 illustrates a process for receiving adaptive bitrate streaming content by multicast in accordance with embodiments of the invention.

In many embodiments of the invention, a playback device is configured to receive multicast adaptive bitrate streams by parsing an adaptive streaming session description for parameters to join a session and measuring bandwidth to a content server. A process for receiving multicast adaptive bitrate streams in accordance with embodiments of the invention is illustrated in FIG. 4.

The process 400 may include joining 402 a multicast group when the device is not yet part of a particular multicast group. Joining the group may include configuring the system kernel or operating system to receive multicast data messages (e.g., binding a port on a network interface) and/or using a communication protocol such as the Internet Group Management Protocol (IGMP) to establish multicast group membership with a multicast router.

The process 400 may also include connecting 404 to a session directory server. In some systems, a session directory server maintains session descriptions for multimedia content sessions that are available to multicast groups.

The process 400 includes receiving 406 an adaptive streaming session description. The session description may be obtained from a session directory server or from a content server. As discussed further above, an adaptive streaming session description contains information a playback device can use to join a session of multicast multimedia content offered with adaptive bitrate streaming. An adaptive streaming session description contains information on streams available to a multicast group such as, but not limited to, port numbers and bandwidth requirements for each stream.

The process 400 includes receiving 408 media content. In many embodiments, a UPD based protocol is utilized for transferring content. In certain embodiments, content is transferred from the content server to the playback device using the real-time protocol (RTP). In additional embodiments, any of a variety of communication protocols that support multicast can be used. In many embodiments of the invention, the content server's address is determined from messages sent to the multicast group by the content server, such as SDP messages. In several embodiments, the recv-from( ) function (available in many Windows and Unix based environments) can be used to determine the source address of a message and store it in a sockaddr structure (sockaddr_from or sockaddr_in various embodiments). Other connection parameters can be determined from the adaptive streaming session description.

While playing back the media content, the total or available bandwidth between the playback device and the content server may fluctuate. As discussed further above, a playback device may switch between alternative streams of content depending on the availability of resources such as bandwidth. Bandwidth can be measured 410 using statistics of the amount of data on the playback device and/or by sending messages to the content server for the purposes of measuring bandwidth. In several embodiments of the invention, the current bandwidth may be determined to be lower than the amount needed for the current stream when there is a buffer underrun or a lack of content data is otherwise detected on the playback device. In many embodiments, the current bandwidth may be determined to be higher than the amount needed for the current stream by sending requests for bandwidth measurement data to a content server as discussed further above. In several embodiments, the requests are sent using a TCP protocol. The content server can respond by sending the playback device bandwidth measurement data that includes any of a variety of payloads. The payload may be random data or may be useful data that is relevant to the content being played back by the device. Useful data can include information relevant to or necessary to decoding the content such as, but not limited to, 2 to 5 seconds of content, redundantly sending key frames, licenses or other DRM information, metadata about the content, and/or thumbnails. The connection can be made using at least some of the same properties as that of the connection transferring the content such as the server address.

In many embodiments of the invention, the block of data requested may be initially small so as not to impede download of content and subsequent blocks increased in size to test the maximum bandwidth. An initial probe may request a block of data of a size that can be reliably transferred in the event that the available bandwidth is comparable to the lowest bandwidth that can support playback of the content. In the event that the download does not take a sufficiently long period of time, an estimate of the bandwidth is performed based upon the initial measurement and a larger block size can be selected based upon the estimated bandwidth. In this way, even larger blocks can be requested until a sufficiently long download has been obtained. Processes for requesting and receiving blocks of bandwidth measurement data can include those disclosed in U.S. patent application Ser. No. 13/251,061 entitled "Systems and Methods for Determining Available Bandwidth and Performing Initial Stream Selection when Commencing Streaming Using Hypertext Transfer Protocol" to van der Schaar et al., filed Sep. 30, 2011, although any of a variety of processes can be utilized in accordance with embodiments of the invention. The disclosure of U.S. patent application Ser. No. 13/251,061 to van der Schaar et al. is hereby incorporated by reference in its entirety.

Downloading bandwidth measurement data may reduce the bandwidth available for downloading content streams. In some embodiments, the effect of downloading bandwidth measurement data on playback of content is measured by monitoring playback performance to detect the point at which requests and/or blocks of data returned result in deteriorating playback performance. The requests and/or blocks of data returned can be reduced in frequency and/or size to restore playback performance. Playback performance can be measured in a variety of ways including, but not limited to, processor utilization, memory utilization, and/or decoding performance.

In several embodiments, a playback device can detect that the current bandwidth is lower than that which is required to receive and play the current stream. For example, the playback device may determine that the receive buffer for the content stream is in an underflow or underrun condition, or that the playback device is otherwise receiving less data than it should for the currently playing content stream. Any of a variety of other metrics can also be utilized in determining whether the current bandwidth is too low for receiving and playing back the current stream including, but not limited to, processor utilization, memory utilization, and/or decoding performance.

When a bandwidth calculation results in determining that a lower or higher quality stream of content is more appropriate for current conditions, the playback device can switch 412 to an alternative stream of content and continue playing back the content with the alternative stream. In some embodiments of the invention, the content is streamed using RTP and different alternative streams are offered by a content server using different ports. A playback device can switch to a different higher or lower quality alternative stream by utilizing a different port of the multicast group. For example, a multicast group can have a multicast group address of 233.0.1.1 and a first stream at a first quality level on port 1234 and a second stream at a second quality level on port 10200. The Universal Resource Identifier (URI) of the first stream and of the second stream can be represented as protocol://233.0.1.1:1234 and protocol://233.0.1.1:10200, respectively. A playback device can switch from streaming data from 233.0.1.1:1234 to instead stream from 233.0.1.1:10200. In other embodiments, different alternative streams are offered by a content server to different multicast groups and a playback device can switch streams by switching to a different multicast group that receives the desired stream. When different alternative streams are offered to different multicast groups, they may utilize the same port. For example, a first multicast group can have a multicast group address of 233.0.1.1 with a first stream at a first quality level on port 1234 and a second multicast group can have a multicast group address of 224.1.2.3 with stream at a second quality level on port 1234. The URI of the first stream and of the second stream can be represented as protocol://233.0.1.1:1234 and protocol://224.1.2.3:1234, respectively. A playback device can switch from streaming data from 233.0.1.1:1234 to instead stream from 224.1.2.3:1234, which can involve joining the multicast group with the address 224.1.2.3 and/or leaving the multicast group with the address 233.0.1.1. Alternative streams typically contain the same perceptual content and can be characterized by having different properties related to their encoding, such as, but not limited to, resolution, maximum bitrate, and/or average bitrate.

In further embodiments of the invention, a playback device can perform some trick play functions (e.g., pause, fast forward, rewind) with the data it has received. Typically, streaming content is stored in a buffer in memory while it is being played back. To the extent the playback device has content stored, it can play back different portions of the content and perform trick play functions provided user instructions from a user.

Although a specific process for receiving and playing back adaptive bitrate streaming content by multicast is discussed above with respect to FIG. 4, any of a variety of processes can be utilized to play back multicast content in accordance with embodiments of the invention. Although the above discussion involves the use of specific protocols such as SDP and RTP, one skilled in the art will recognize that any of a variety of communication protocols with similar functionality and/or features can be utilized in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method of receiving and playing back adaptive bitrate streaming content using a playback device, the method comprising:

receiving an adaptive streaming session description comprising information about a piece of adaptive streaming content and information for accessing a multicast session of the piece of adaptive streaming content using a playback device;

receiving a set of at least one portions of a first alternative stream of the piece of adaptive streaming content sent to a first multicast group that includes the playback device using the playback device;

computing a bandwidth measurement using the playback device; and switching to a second alternative stream of the piece of adaptive streaming content based upon the computed bandwidth measurement to receive a set of at least one portions of the second alternative stream using the playback device.

2. The method of claim 1 further comprising joining the first multicast group.

3. The method of claim 2 wherein joining the first multicast group comprises establishing multicast group membership using Internet Group Management Protocol (IGMP).

4. The method of claim 1 wherein the adaptive streaming session description is a modified Session Description Protocol (SDP) message.

5. The method of claim 1 wherein the adaptive streaming session description comprises a first multicast group address associated with the first multicast group.

6. The method of claim 1 wherein the adaptive streaming session description comprises a plurality of bandwidth and media fields associated with a plurality of alternative streams of the piece of content.

7. The method of claim 6 wherein each media field designates a media type and a port number.

8. The method of claim 1 further comprising receiving the adaptive streaming session description from a session directory server using the playback device.

9. The method of claim 1 further comprising receiving the adaptive streaming session description from the content server using the playback device.

10. The method of claim 1 wherein computing a bandwidth measurement using the playback device comprises receiving bandwidth measurement data using the playback device that expects to receive the bandwidth measurement data without requesting it.

11. The method of claim 1 wherein computing a bandwidth measurement using the playback device comprises sending bandwidth requests to a content server and receiving bandwidth measurement data with which the playback device can calculate available bandwidth.

12. The method of claim 11 wherein bandwidth measurement data comprises random data.

13. The method of claim 11 wherein bandwidth measurement data comprises key frames from the content.

14. The method of claim 11 wherein bandwidth measurement data comprises metadata about the content.

15. The method of claim 11 wherein bandwidth measurement data comprises thumbnails of the content.

16. The method of claim 11 wherein receiving bandwidth measurement data with which the playback device can calculate available bandwidth comprises receiving progressively larger amounts of data.

17. The method of claim 16 wherein receiving progressively larger amounts of data is halted once the playback device has determined that there is sufficient additional bandwidth to switch to the second alternative stream that has a higher maximum bitrate than the first alternative stream.

18. The method of claim 1 further comprising buffering the received set of portions of the alternative stream of the piece of adaptive streaming content using the playback device;

receiving a user instruction using the playback device; and performing a trick play operation in displaying content based upon the received user instruction using the playback device.

19. The method of claim 1 wherein switching to a second alternative stream of the piece of adaptive streaming content based upon the computed bandwidth measurement using the playback device comprises receiving the second alternative stream using a different port than the port used to receive the first alternative stream.

20. A playback device comprising:

a non-volatile storage containing a playback application;

at least one processor, wherein the playback application causes the set at least one processor to receive and play back adaptive bitrate streaming content by performing the steps of:

receiving an adaptive streaming session description comprising information about a piece of adaptive streaming content and information for accessing a multicast session of the piece of adaptive streaming content;

receiving a set of at least one portions of a first alternative stream of the piece of adaptive streaming content sent to a first multicast group that includes the playback device;

computing a bandwidth measurement; and switching to a second alternative stream of the piece of adaptive streaming content based upon the computed bandwidth measurement to receive a set of at least one portions of the second alternative stream.

* * * * *